(12) United States Patent
Mow et al.

(10) Patent No.: US 10,476,136 B2
(45) Date of Patent: Nov. 12, 2019

(54) ELECTRONIC DEVICE WITH SPEAKER PORT ALIGNED ANTENNAS

(71) Applicant: Apple Inc., Cupertino, CA (US)

(72) Inventors: Matthew A. Mow, Los Altos, CA (US); Basim H. Noori, San Jose, CA (US); Khan M. Salam, Dublin, CA (US); Mattia Pascolini, San Francisco, CA (US); Ming-Ju Tsai, Sunnyvale, CA (US); Simone Paulotto, Redwood City, CA (US); Travis A. Barbieri, Pacifica, CA (US); Victor C. Lee, Sunnyvale, CA (US); Xu Han, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 148 days.

(21) Appl. No.: 15/655,015

(22) Filed: Jul. 20, 2017

(65) Prior Publication Data

US 2019/0027808 A1 Jan. 24, 2019

(51) Int. Cl.
*H01Q 1/24* (2006.01)
*H01Q 1/48* (2006.01)
(Continued)

(52) U.S. Cl.
CPC ............... *H01Q 1/243* (2013.01); *H01Q 1/48* (2013.01); *H01Q 3/26* (2013.01); *H01Q 13/106* (2013.01);
(Continued)

(58) Field of Classification Search
CPC ........ H01Q 1/243; H01Q 13/106; H01Q 1/48; H01Q 9/0407; H04R 1/025; H04M 1/03

USPC ........................................................ 381/386
See application file for complete search history.

(56) References Cited

U.S. PATENT DOCUMENTS

| | | | |
|---|---|---|---|
| 8,489,162 B1 * | 7/2013 | Dou | H01Q 1/243 |
| | | | 343/746 |
| 9,178,268 B2 * | 11/2015 | Zhu | H01Q 1/2266 |

(Continued)

FOREIGN PATENT DOCUMENTS

| | | |
|---|---|---|
| WO | 2003077507 A1 | 9/2003 |
| WO | 2013190437 A1 | 12/2013 |

OTHER PUBLICATIONS

Noori et al., U.S. Appl. No. 15/138,684, filed Apr. 26, 2016.
Noori et al., U.S. Appl. No. 15/138,689, filed Apr. 26, 2016.
Mow et al., U.S. Appl. No. 15/217,805, filed Jul. 22, 2016.

*Primary Examiner* — Oyesola C Ojo
(74) *Attorney, Agent, or Firm* — Treyz Law Group, P.C.; Michael H. Lyons

(57) ABSTRACT

An electronic device may be provided with wireless circuitry, a conductive housing, and a display. The display may have an active area that displays image data and an inactive area that does not display image data. The active area may completely surround the inactive area at a front face of the device. A speaker port may be aligned with the inactive area and may emit sound through the inactive area. The wireless circuitry may include first and second antenna arrays. The first array may be configured to transmit and receive wireless signals at frequencies between 10 GHz and 300 GHz through the inactive area of the display. The second array may be configured to transmit and receive wireless signals at frequencies between 10 GHz and 300 GHz through a slot in a rear wall of the conductive housing. Control circuitry may perform beam steering using the first and second arrays.

20 Claims, 9 Drawing Sheets

(51) Int. Cl.
*H04M 1/03* (2006.01)
*H04R 1/02* (2006.01)
*H01Q 13/10* (2006.01)
*H01Q 3/26* (2006.01)
*H01Q 25/00* (2006.01)
*H01Q 9/04* (2006.01)
*H04M 1/02* (2006.01)

(52) U.S. Cl.
CPC ............ *H01Q 25/005* (2013.01); *H04M 1/03* (2013.01); *H04R 1/025* (2013.01); *H01Q 9/0407* (2013.01); *H01Q 13/10* (2013.01); *H04M 1/026* (2013.01); *H04M 1/0266* (2013.01)

(56) References Cited

U.S. PATENT DOCUMENTS

| | | | |
|---|---|---|---|
| 2004/0203997 A1* | 10/2004 | Kaikuranta | H01Q 1/243 455/550.1 |
| 2004/0204024 A1 | 10/2004 | Voth et al. | |
| 2007/0049326 A1 | 3/2007 | Kim | |
| 2007/0139283 A1* | 6/2007 | Tran | H01Q 1/243 343/702 |
| 2008/0095394 A1 | 4/2008 | Yoon | |
| 2012/0020002 A1* | 1/2012 | Mathew | G06F 1/1637 361/679.27 |
| 2013/0050032 A1* | 2/2013 | Shiu | H01Q 1/24 343/702 |
| 2013/0094126 A1* | 4/2013 | Rappoport | G02B 27/01 361/679.01 |
| 2015/0288057 A1 | 10/2015 | Shimura et al. | |
| 2015/0325922 A1* | 11/2015 | Fujita | H01Q 19/06 343/753 |
| 2017/0110787 A1 | 4/2017 | Ouyang et al. | |
| 2017/0117754 A1 | 4/2017 | Noori et al. | |
| 2018/0013199 A1* | 1/2018 | Rubin | H01Q 21/28 |
| 2018/0109881 A1* | 4/2018 | Chew | H04R 25/402 |
| 2018/0219296 A1* | 8/2018 | Chi | H01Q 1/243 |

* cited by examiner

ELECTRONIC DEVICE WITH SPEAKER PORT ALIGNED ANTENNAS

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies may support high data rates, but may raise significant challenges. For example, millimeter wave communications are often line-of-sight communications and can be characterized by substantial attenuation during signal propagation. In addition, the presence of conductive structures can influence antenna performance. For example, the presence of conductive housing structures or other device structures may limit the volume available for implementing antennas, thereby adversely affecting antenna bandwidth, and/or may block the antennas from wirelessly communicating with external communications equipment.

It would therefore be desirable to be able to provide electronic devices with improved wireless communications circuitry such as communications circuitry that supports communications at frequencies greater than 10 GHz.

SUMMARY

An electronic device may be provided with wireless circuitry, a conductive housing, and a display. The display may have an active area that includes pixel circuitry that displays image data and an inactive area that does not display image data. The active area may completely surround the inactive area at a front face of the device. A speaker port may be aligned with the inactive area and may emit sound through the inactive area.

The wireless circuitry may include one or more antennas and transceiver circuitry such as millimeter wave transceiver circuitry. The antennas may be organized in beam steering arrays. Multiple beam steering arrays may be formed from metal traces on one or more sides of a substrate such as a printed circuit. The millimeter wave transceiver circuitry may be mounted to the substrate. The printed circuit may be mounted within the conductive housing so that a first array is aligned with the inactive area of the display and a second array is aligned with a dielectric-filled opening in a rear wall of the conductive housing. The first array may transmit and receive wireless signals at frequencies between 10 GHz and 300 GHz through the inactive region of the display. The second array may transmit and receive wireless signals at frequencies between 10 GHz and 300 GHz through the dielectric-filled opening in the rear wall.

The substrate may be flat or may include one or more bends. If desired, the substrate may be flat and the first and second arrays may be formed on opposing sides of the substrate. If desired, the first and second arrays may be formed on the same side of the substrate and the substrate may be folded around a speaker associated with the speaker port or other components aligned with the inactive area of the display. If desired, the first and second arrays may be formed on opposing sides of the substrate and the substrate may include multiple bends around the speaker.

Control circuitry in the electronic device may perform beam steering operations using the first and second arrays. When configured in this way, the first and second arrays may transmit and receive wireless signals at frequencies between 10 GHz and 300 GHz over a full sphere around the electronic device, despite the presence of conductive housing structures and active display components in the vicinity of the wireless circuitry.

DETAILED DESCRIPTION

Figure 1:
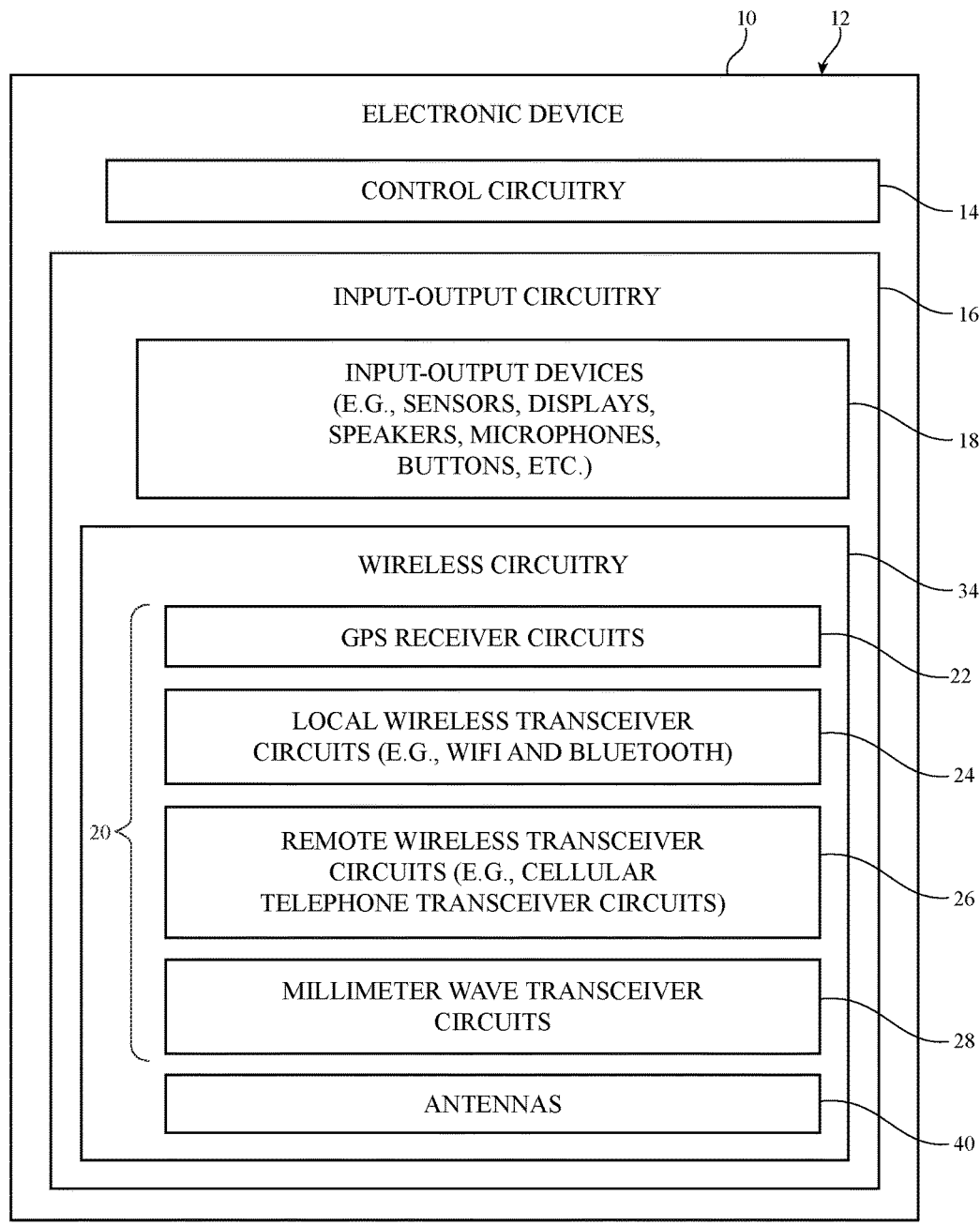
FIG. 1 is a schematic diagram of an illustrative electronic device with wireless communications circuitry in accordance with an embodiment.

An electronic device such as electronic device 10 of FIG. 1 may contain wireless circuitry. The wireless circuitry may include one or more antennas. The antennas may include phased antenna arrays that are used for handling millimeter wave and centimeter wave communications. Millimeter wave communications, which are sometimes referred to as extremely high frequency (EHF) communications, involve signals at 60 GHz or other frequencies between about 30 GHz and 300 GHz. Centimeter wave communications involve signals at frequencies between about 10 GHz and 30 GHz. If desired, device 10 may also contain wireless communications circuitry for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Other configurations may be used for device 10 if desired. The example of FIG. 1 is merely illustrative.

Device 10 may include a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. In some scenarios, housing 12 may be formed from dielectric or other low-conductivity material. In other situations, housing 12 or at least some of the structures that make up housing 12 may be formed from metal elements.

FIG. 1 is a schematic diagram showing illustrative components that may be used in device 10. As shown in FIG. 1, device 10 may include storage and processing circuitry such as control circuitry 14. Control circuitry 14 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 14 may be used to control the operation of device 10. This processing circuitry may be based on one or more microprocessors, microcontrollers, digital signal processors, baseband processor integrated circuits, application specific integrated circuits, etc.

Control circuitry 14 may be used to run software on device 10, such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, etc.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors (e.g., infrared light sensors, ambient light sensors, etc.), accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include transceiver circuitry 20 for handling various radio-frequency communications bands. For example, circuitry 34 may include transceiver circuitry 22, 24, 26, and 28.

Transceiver circuitry 24 may be wireless local area network (WLAN) transceiver circuitry. Transceiver circuitry 24 may handle 2.4 GHz and 5 GHz bands for WiFi® (IEEE 802.11) communications and may handle the 2.4 GHz Bluetooth® communications band.

Circuitry 34 may use cellular telephone transceiver circuitry 26 for handling wireless communications in frequency ranges such as a communications band from 700 to 960 MHz, a communications band from 1710 to 2170 MHz, and a communications band from 2300 to 2700 MHz or other communications bands between 700 MHz and 4000 MHz or other suitable frequencies (as examples). Circuitry 26 may handle voice data and non-voice data.

Millimeter wave transceiver circuitry 28 (sometimes referred to as extremely high frequency (EHF) transceiver circuitry 28 or transceiver circuitry 28) may support communications at frequencies between about 10 GHz and 300 GHz. For example, transceiver circuitry 28 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, transceiver circuitry 28 may support communications in an IEEE K communications band between about 18 GHz and 27 GHz, a $K_a$ communications band between about 26.5 GHz and 40 GHz, a $K_n$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, circuitry 28 may support IEEE 802.11ad communications at 60 GHz and/or $5^{th}$ generation mobile networks or $5^{th}$ generation wireless systems (5G) communications bands between 27 GHz and 90 GHz. Circuitry 28 may be formed from one or more integrated circuits (e.g., multiple integrated circuits mounted on a common printed circuit in a system-in-package device, one or more integrated circuits mounted on different substrates, etc.). While circuitry 28 is sometimes referred to herein as millimeter wave transceiver circuitry 28, millimeter wave transceiver circuitry 28 may handle communications at any desired communications bands at frequencies between 10 GHz and 300 GHz (e.g., in millimeter wave communications bands, centimeter wave communications bands, etc.).

Wireless communications circuitry 34 may include satellite navigation system circuitry such as Global Positioning System (GPS) receiver circuitry 22 for receiving GPS signals at 1575 MHz or for handling other satellite positioning data (e.g., GLONASS signals at 1609 MHz). Satellite navigation system signals for receiver 22 are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Extremely high frequency (EHF) wireless transceiver circuitry 28 may convey signals over these short distances that travel between transmitter and receiver over a line-of-sight path. To enhance signal reception for millimeter and centimeter wave communications, phased antenna arrays and beam steering techniques may be used (e.g., schemes in which antenna signal phase and/or magnitude for each antenna in an array is adjusted to perform beam steering). The phased antenna arrays may include, for example, two or more antennas arranged in a grid having rows and columns or in other patterns (e.g., a pattern of concentric rings, circular patterns, etc.). Antenna diversity schemes may also be used to ensure that the antennas that have become blocked or that are otherwise degraded due to the operating environment of device 10 can be switched out of use and higher-performing antennas used in their place.

Wireless communications circuitry 34 can include circuitry for other short-range and long-range wireless links if desired. For example, wireless communications circuitry 34 may include circuitry for receiving television and radio signals, paging system transceivers, near field communications (NFC) circuitry, etc.

Antennas 40 in wireless communications circuitry 34 may be formed using any suitable antenna types. For example, antennas 40 may include antennas with resonating elements that are formed from patch antenna structures, loop antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can one or more antennas such as antennas arranged in one or more phased antenna arrays for handling millimeter and centimeter wave communications.

Transmission line paths may be used to route antenna signals within device 10. For example, transmission line paths may be used to couple antenna structures 40 to transceiver circuitry 20. Transmission lines in device 10 may include coaxial probes realized by metalized vias, microstrip transmission lines, stripline transmission lines, edge-coupled microstrip transmission lines, edge-coupled stripline transmission lines, coaxial cable structures, waveguide structures, transmission lines formed from combinations of transmission lines of these types, etc. Filter circuitry, switching circuitry, phase shifter circuitry, amplifier circuitry, impedance matching circuitry, and other circuitry may be interposed within the transmission lines, if desired.

In devices such as handheld devices, the presence of an external object such as the hand of a user or a table or other surface on which a device is resting has a potential to block wireless signals such as millimeter wave signals. Accordingly, it may be desirable to incorporate multiple antennas or phased antenna arrays into device 10, each of which is placed in a different location within device 10. With this type of arrangement, an unblocked antenna or phased antenna array may be switched into use. In scenarios where a phased antenna array is formed in device 10, once switched into use, the phased antenna array may use beam steering to optimize wireless performance. Configurations in which antennas from one or more different locations in device 10 are operated together may also be used.

Figure 2:
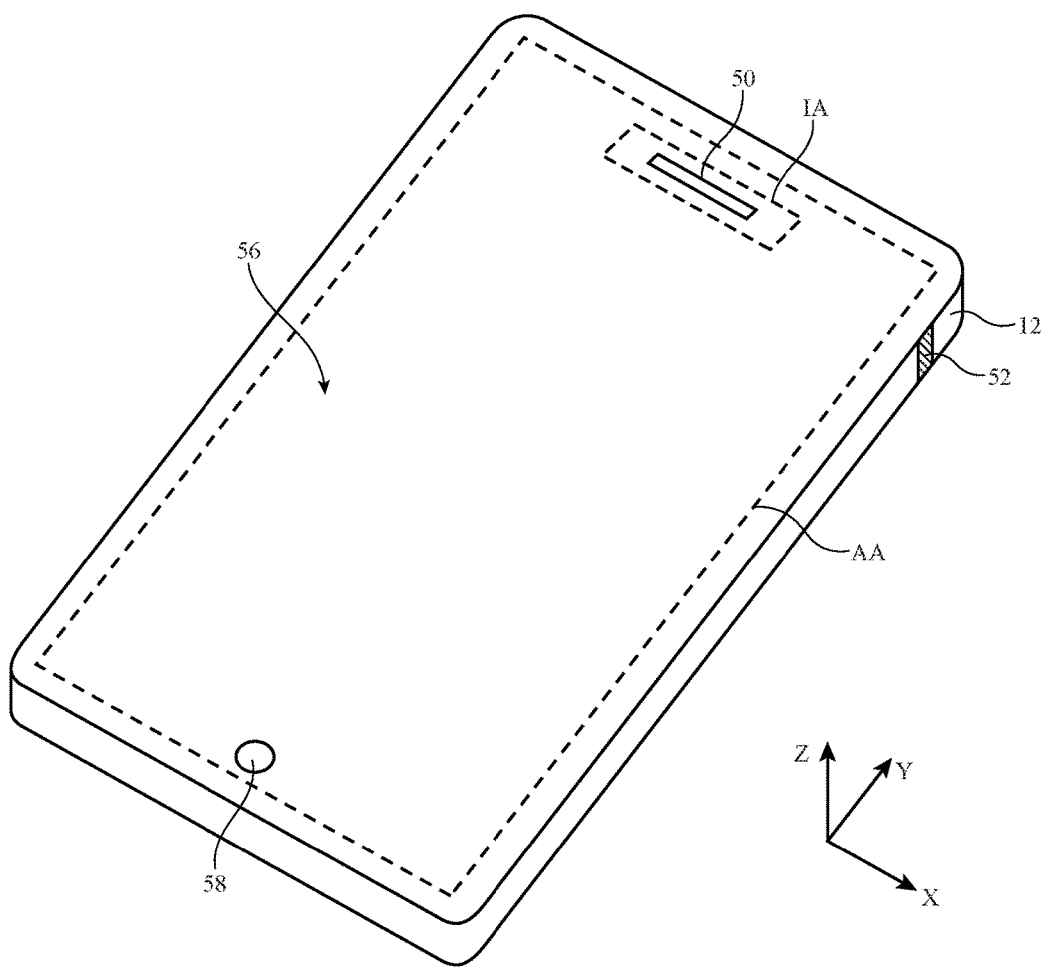
FIG. 2 is a perspective view of an illustrative electronic device with wireless communications circuitry in accordance with an embodiment.

FIG. 2 is a perspective view of electronic device 10 having antennas for conveying signals at frequencies greater than 10 GHz such as millimeter wave signals. As shown in FIG. 2, device 10 may include a display such as display 56 mounted to housing 12. Display 56 may be mounted on the front face of device 10 (e.g., display 56 may include a cover layer that forms an exterior surface of device 10). Display 56 may be a touch screen that incorporates capacitive or resistive touch electrodes or may be insensitive to touch. The rear face of housing 12 (i.e., the face of device 10 opposing the front face of device 10) may have a planar housing wall. The rear housing wall may have slots that pass entirely through the rear housing wall and that therefore separate housing wall portions (and/or sidewall portions) of housing 12 from each other. Housing 12 (e.g., the rear housing wall, sidewalls, etc.) may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Display 56 may include pixels formed from light-emitting diodes (LEDs), organic LEDs (OLEDs), plasma cells, electrowetting pixels, electrophoretic pixels, liquid crystal display (LCD) components, or other suitable pixel structures. A display cover layer such as a layer of clear glass or plastic may cover the surface of display 56 or the outermost layer of display 56 may be formed from a color filter layer, thin-film transistor layer, or other display layer. Buttons such as button 58 may pass through openings in the cover layer or may be formed under the cover layer.

The cover layer may have openings such as an opening for speaker port 50. Speaker port 50 may include, for example, an ear speaker that plays audio for a user of device 10 (e.g., speaker port 50 may be located adjacent to a user's ear when the user is holding device 10 to their head to conduct a telephone call or may form a right or left stereo speaker when device 10 is held in a landscape orientation). Speaker port 50 may be located at an opposite end of housing 12 from button 58 and microphone components in device 10 (e.g., speaker port 50 may be formed at the upper end of device 10 whereas button 58 and the microphone of device 10 may be formed at the lower end of device 10).

Housing 12 may include peripheral housing structures. The peripheral housing structures may run around the periphery of device 10 and display 56. In configurations in which device 10 and display 56 have a rectangular shape with four edges, the peripheral housing structures may be implemented using peripheral housing structures that have a rectangular ring shape with four corresponding edges (as an example). The peripheral housing structures or part of the peripheral housing structures may serve as a bezel for display 56 (e.g., a cosmetic trim that surrounds all four sides of display 56 and/or that helps hold display 56 to device 10).

The peripheral housing structures may also, if desired, form sidewall structures for device 10 (e.g., by forming a metal band with vertical sidewalls, curved sidewalls, etc.).

The peripheral housing structures may be formed of a conductive material such as metal and may therefore sometimes be referred to as peripheral conductive housing structures, conductive housing structures, peripheral metal structures, or a peripheral conductive housing member (as examples). The peripheral housing structures may be formed from a metal such as stainless steel, aluminum, or other suitable materials. One, two, or more than two separate structures may be used in forming the peripheral housing structures.

It is not necessary for the peripheral housing structures to have a uniform cross-section. For example, the top portion of the peripheral housing structures may, if desired, have an inwardly protruding lip that helps hold display 56 in place. The bottom portion of the peripheral housing structures may also have an enlarged lip (e.g., in the plane of the rear surface of device 10). The peripheral housing structures may have substantially straight vertical sidewalls, may have sidewalls that are curved, or may have other suitable shapes. In some configurations (e.g., when the peripheral housing structures serve as a bezel for display 14), the peripheral housing structures may run around the lip of housing 12 (i.e., the peripheral housing structures may cover only the edge of housing 12 that surrounds display 56 and not the rest of the sidewalls of housing 12).

If desired, housing 12 may have a conductive rear surface. For example, housing 12 may be formed from a metal such as stainless steel or aluminum. The rear surface of housing 12 may lie in a plane that is parallel to display 56. In configurations for device 10 in which the rear surface of housing 12 is formed from metal, it may be desirable to form parts of the peripheral conductive housing structures as integral portions of the housing structures forming the rear surface of housing 12. For example, a rear housing wall of device 10 may be formed from a planar metal structure and portions of the peripheral housing structures on the sides of housing 12 may be formed as flat or curved vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions.

Display 56 may have an array of pixels that form an active area AA that displays images for a user of device 10. If desired, active area AA may also include touch screen circuitry (e.g., touch sensor circuitry) that is configured to receive a touch input from a user. In order to maximize the viewable area of display 56 for a user of device 10, active area AA may extend between two, three, or all four of the edges of housing 12 (e.g., from the left side to the right side and from the bottom side to the top side of the front face of device 10 as shown in FIG. 2).

In order to accommodate speaker port 50 (sometimes referred to herein as ear speaker 50 or ear speaker port 50) and/or other device components, display 56 may include an inactive area such as inactive area IA that overlaps (e.g., aligns with) speaker port 50 (e.g., the entirety of speaker port 50 may lie within the outline of inactive area IA). Inactive area IA (sometimes referred to herein as inactive region IA) may be free from the active circuitry of display 56 such as display pixels, touch sensor circuitry (e.g., touch sensor electrodes), or other active components. This may allow space within display 56 for forming speaker port 50 even though active area AA extends between each edge of housing 12. When configured in this way, active area AA may fill substantially all of the area of device 10 between the peripheral conductive housing structures (e.g., between the sidewalls of housing 12) except for inactive area IA at speaker port 50.

Inactive area IA may be surrounded by active area AA of display 56 (e.g., completely surrounded on four sides at the front face of device 10 such that opposing first and second edges and opposing third and fourth edges of area IA are defined by area AA). For example, different portions of active area AA may be interposed between inactive area IA and each of the four sidewalls of device 10 at the front face of device 10. In other words, display 56 may display image data (e.g., pixels in active area AA may display images) and, if desired, may gather touch sensor input along all sides of inactive area IA (e.g., on all sides surrounding speaker port 50) whereas inactive area IA itself does not display images or gather touch sensor input. This may serve to maximize the size of active area AA across the front face of device 10 while still accommodating an ear speaker (e.g., so that audio data can still be emitted by device 10 through speaker port 50), for example.

Housing 12 may include internal conductive structures such as metal frame members and a planar conductive housing member (sometimes referred to as a midplate) that spans the walls of housing 12 (i.e., a substantially rectangular sheet formed from one or more parts that is welded or otherwise connected between opposing sides of the sidewalls of housing 12). Device 10 may also include conductive structures such as printed circuit boards, components mounted on printed circuit boards, and other internal conductive structures. These conductive structures, which may be used in forming a ground plane in device 10, may be located in the center of housing 12 and may extend under active area AA and inactive area IA of display 56, for example.

If desired, openings may be formed within the conductive structures of device 10 (e.g., between the peripheral conductive housing structures of housing 12 and opposing conductive ground structures such as conductive housing midplate or rear housing wall structures, a printed circuit board, or other components in device 10). These openings, which may sometimes be referred to as gaps, may be filled with air, plastic, and other dielectrics and may be used in forming slot antenna resonating elements for one or more antennas 40 in device 10 or may be used in forming antenna windows for one or more antennas located within housing 12.

Conductive housing structures and other conductive structures in device 10 such as a midplate, traces on a printed circuit board, display 56, and conductive electronic components may serve as a ground plane for the antennas in device 10. In general, device 10 may include any suitable number of antennas 40 (e.g., one or more, two or more, three or more, four or more, etc.). Some of the antennas 40 in device 10 may be located at opposing first and second ends of an elongated device housing (e.g., at different ends of device 10 as taken along the Y-axis of FIG. 2), along one or more edges of a device housing, in the center of a device housing, in other suitable locations, or in one or more of these locations. The arrangement of FIG. 2 is merely illustrative.

Portions of the peripheral conductive housing structures of housing 12 may be provided with peripheral gap structures. For example, the peripheral conductive housing structures may be provided with one or more gaps such as gap 52, as shown in FIG. 2. The gaps in the peripheral housing structures may be filled with dielectric such as polymer, ceramic, glass, air, other dielectric materials, or combinations of these materials. Gaps such as gap 52 may divide the peripheral housing structures into one or more peripheral conductive segments. There may be, for example, two peripheral conductive segments in the peripheral housing structures (e.g., in an arrangement with one gap 52), three peripheral conductive segments (e.g., in an arrangement with three of gaps 52), four peripheral conductive segments (e.g., in an arrangement with four gaps 52, etc.). The segments of the peripheral conductive housing structures that are formed in this way may form parts of one or more antennas 40 in device 10 (e.g., may form a resonating element and/or ground plane for one or more antennas 40).

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into the peripheral housing structures and may form antenna slots, gaps 52, and other structures in device 10. Polymer or other dielectric may fill these grooves and other housing openings. In some situations, housing openings that form antenna slots and other structure may be filled with a dielectric such as air.

Antennas 40 in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc. In one suitable arrangement, device 10 may include a first antenna at the upper end of housing 12 and a second antenna at the lower end of housing 12 that each cover cellular telephone communications bands. The first and second antennas may both have antenna resonating element arms formed from segments of housing 12. Other antennas such as arrays of antennas for conveying signals at frequencies greater than 10 GHz may be formed within housing 12.

In configurations in which housing 12 is formed entirely or nearly entirely from a dielectric, antennas 40 internal to housing 12 may transmit and receive antenna signals through any suitable portion of the dielectric. In configurations in which housing 12 is formed from a conductive material such as metal, conductive structures in device 10 such as metal portions of housing 12 and conductive components within display active area AA may block or disrupt wireless communications performed by antennas 40 within housing 12. In order to accommodate antennas internal to housing 12, openings may be formed in the metal portions of housing 12.

Figure 3:
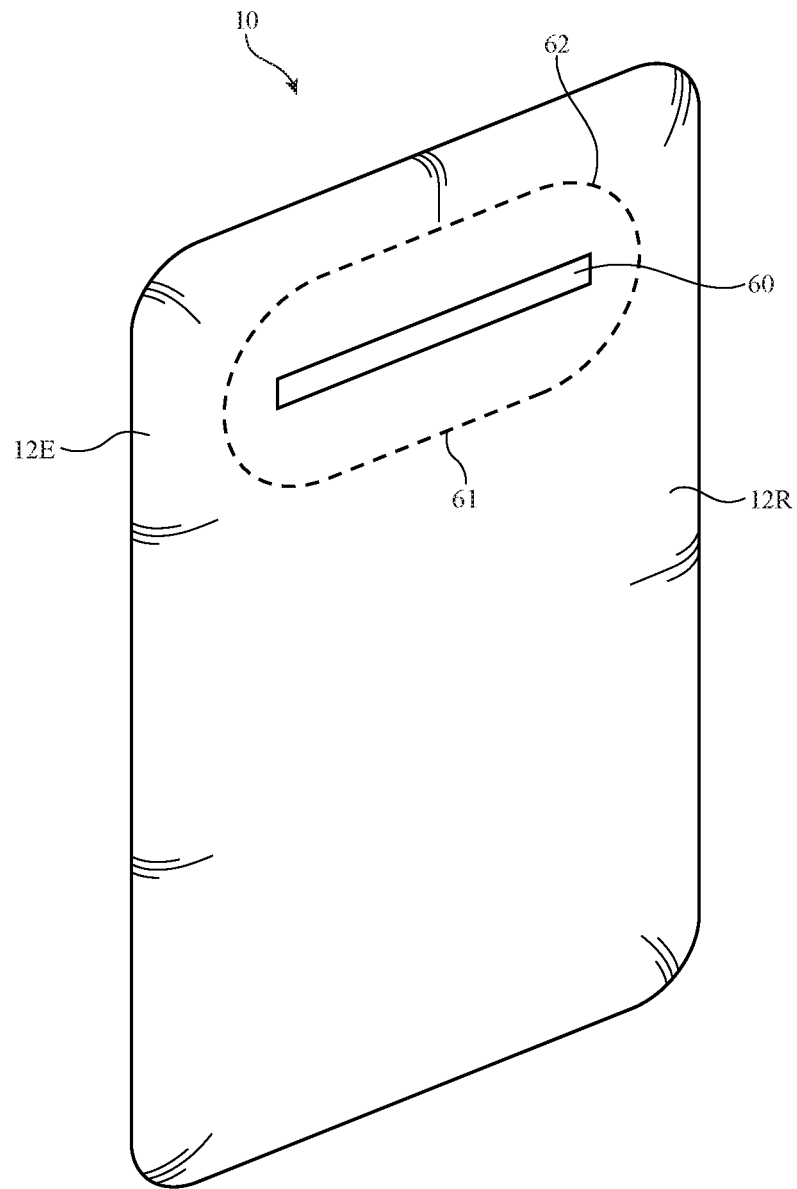
FIG. 3 is a rear perspective view of an illustrative electronic device with wireless communications circuitry in accordance with an embodiment.

FIG. 3 is a rear perspective view of housing 12 of device 10 of FIG. 2 showing how housing 12 may include openings for accommodating internal antennas within housing 12. As shown in FIG. 3, housing 12 of device 10 may include a rear wall portion 12R and sidewall portions (edge portions) 12E (sometimes referred to herein as peripheral conductive structures 12E or peripheral conductive housing structures 12E). Rear wall portion 12R and sidewall portion 12E of housing 12 may be formed from metal (e.g., to enhance the aesthetic and structural properties of device 10). Rear wall portion 12R and sidewall portion 12E may be formed from a single integral piece of metal or may be formed from separate pieces of metal, for example. Rear wall portion 12R may lie in a plane parallel to the face of display 56 at the front side of device 10, for example.

An opening such as opening 60 may be formed within rear wall 12R. Opening 60 may be plastic-filled opening or other dielectric filled opening. One or more antennas 40 within device 10 (e.g., a phased array of antennas 40 for conveying wireless signals at frequencies greater than 10 GHz) may be mounted in alignment with opening 60 (e.g., within region 61). Opening 60 may sometimes be referred to as a dielectric antenna window, dielectric gap, dielectric-filled opening, dielectric-filled slot, elongated dielectric opening region, etc., and may allow antenna signals to be transmitted to external equipment from antennas 40 mounted within the interior of device 10 and may allow internal antennas 40 to receive antenna signals from external equipment.

The example of FIG. 3 is merely illustrative. If desired, there may be more than one opening 60 for accommodating internal antennas 40. Opening 60 may have any desired shape. Opening 60 may extend across the entire width of device 10 (e.g., between two gaps 52 in housing 12 as shown in FIG. 2) or across some of the width of device 10. Gaps 52 may serve as antenna windows for internal antennas 40 if desired.

While slots such as slot 60 of FIG. 3 may allow antennas 40 within device 10 to freely convey wireless signals out of the back side of device 10, conductive components (e.g., display pixel circuitry, touch sensor electrodes, etc.) within active area AA of display 56 may block wireless signals at the front face of device 10. If desired, one or more internal antennas 40 (e.g., an array of antennas for conveying wireless signals at frequencies greater than 10 GHz) may be aligned with inactive area IA of display 56. Because inactive area IA is free of the conductive components that are used to form active area AA and that serve to block wireless signals, wireless signals for these antennas 40 may be freely conveyed through the front face of device 10 via inactive area IA. This may allow internal antennas 40 within device 10 to provide coverage over an entire sphere around device 10 despite the presence of conductive housing structures 12 and active circuitry in display 56.

Figure 4:
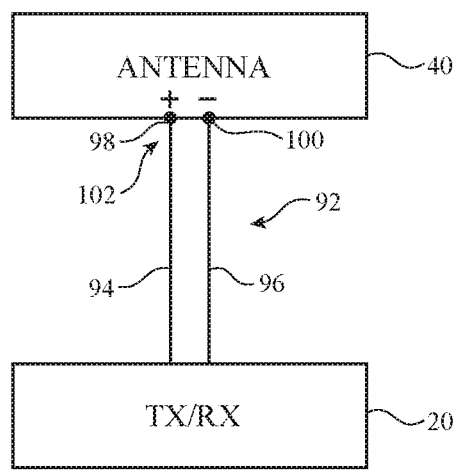
FIG. 4 is a diagram of an illustrative transceiver circuit and antenna in accordance with an embodiment.

A schematic diagram of an antenna 40 for conveying wireless signals at frequencies from 10 GHz to 300 GHz or another antenna 40 coupled to transceiver circuitry 20 (e.g., millimeter wave transceiver circuitry 28 and/or other transceiver circuitry 20 of FIG. 1) is shown in FIG. 4. As shown in FIG. 4, radio-frequency transceiver circuitry 20 may be coupled to antenna feed 102 of antenna 40 using transmission line 92. Antenna feed 102 may include a positive antenna feed terminal such as positive antenna feed terminal 98 and may have a ground antenna feed terminal such as ground antenna feed terminal 100. Transmission line 92 may be formed form metal traces on a printed circuit or other conductive structures and may have a positive transmission line signal path such as path 94 that is coupled to terminal 98 and a ground transmission line signal path such as path 96 that is coupled to terminal 100. Transmission line paths such as path 92 may be used to route antenna signals within device 10. For example, transmission line paths may be used to couple antenna structures such as one or more antennas in an array of antennas to transceiver circuitry 90. Transmission lines in device 10 may include coaxial cable paths, coaxial probes, waveguide structures, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, phase shifting circuitry, amplifier circuitry, and other circuitry may be interposed within transmission line 92 and/or circuits such as these may be incorporated into antenna 40 (e.g., to support antenna tuning, to support operation in desired frequency bands, etc.).

Device 10 may contain multiple antennas 40. The antennas may be used together or one of the antennas may be switched into use while other antenna(s) are switched out of use. If desired, control circuitry 14 may be used to select an optimum antenna to use in device 10 in real time and/or to select an optimum setting for adjustable wireless circuitry associated with one or more of antennas 40. Antenna adjustments may be made to tune antennas to perform in desired frequency ranges, to perform beam steering with a phased antenna array, and to otherwise optimize antenna performance. Sensors may be incorporated into antennas 40 to gather sensor data in real time that is used in adjusting antennas 40.

In some configurations, antennas 40 may include antenna arrays (e.g., phased antenna arrays to implement beam steering functions). For example, the antennas that are used in handling millimeter wave signals or other signals at frequencies between 10 GHz and 300 GHz for transceiver circuitry 28 may be implemented within phased antenna arrays. The radiating elements in a phased antenna array for supporting wireless communications at frequencies between 10 GHz and 300 GHz (e.g., millimeter wave communications) may be patch antennas, dipole antennas, dipole antennas with directors and reflectors in addition to dipole antenna resonating elements (sometimes referred to as Yagi antennas or beam antennas), or other suitable antenna elements. Transceiver circuitry can be integrated with the phased antenna arrays to form integrated phased antenna array and transceiver circuit modules.

Figure 5:
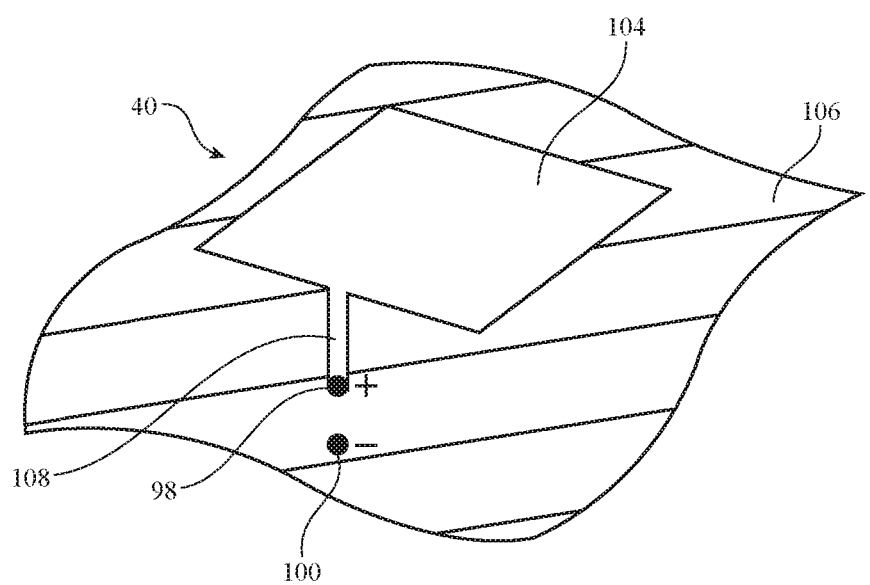
FIG. 5 is a perspective view of an illustrative patch antenna that may be used in an electronic device in accordance with an embodiment.

An illustrative patch antenna is shown in FIG. 5. As shown in FIG. 5, patch antenna 40 may have a patch antenna resonating element 104 that is separated from and parallel to a ground plane such as antenna ground plane 106. Arm 108 may be coupled between patch antenna resonating element 104 and positive antenna feed terminal 98 of antenna feed 102. Ground antenna feed terminal 100 of feed 102 may be coupled to ground plane 106.

Patch antenna resonating element 104 and ground 106 may be formed from conductive traces patterned on a dielectric substrate such as layers of rigid or flexible printed circuit board substrate, metal foil, sheet metal (e.g., strips of sheet metal embedded in molded plastic or attached to dielectric supports using adhesive, etc.), electronic device housing structures, or any other desired conductive structures. The length of the sides of patch antenna resonating element 104 (sometimes referred to herein as patch 104) may be selected so that antenna 40 resonates at a desired operating frequency. For example, the sides of element 104 may each have a length that is approximately equal to half of the wavelength of the signals conveyed by antenna 40.

The example of FIG. 5 is merely illustrative. If desired, multiple feeds 102 may be coupled to the patch antenna of FIG. 5 to cover other polarizations (e.g., horizontal and vertical polarizations, elliptical or circular polarizations, etc.). Patch 104 may have any desired shape.

Antennas of the types shown in FIG. 5 and/or other antennas 40 (e.g., dipole antennas, Yagi antennas, etc.) may be used in forming antennas for handling wireless signals between 10 GHz and 300 GHz (e.g., millimeter wave antennas for handling millimeter wave signals). Phased antenna arrays of these types may be formed on an integrated phased antenna array and transceiver module (sometimes referred to herein as an integrated antenna module or integrated antenna array module).

Figure 6:
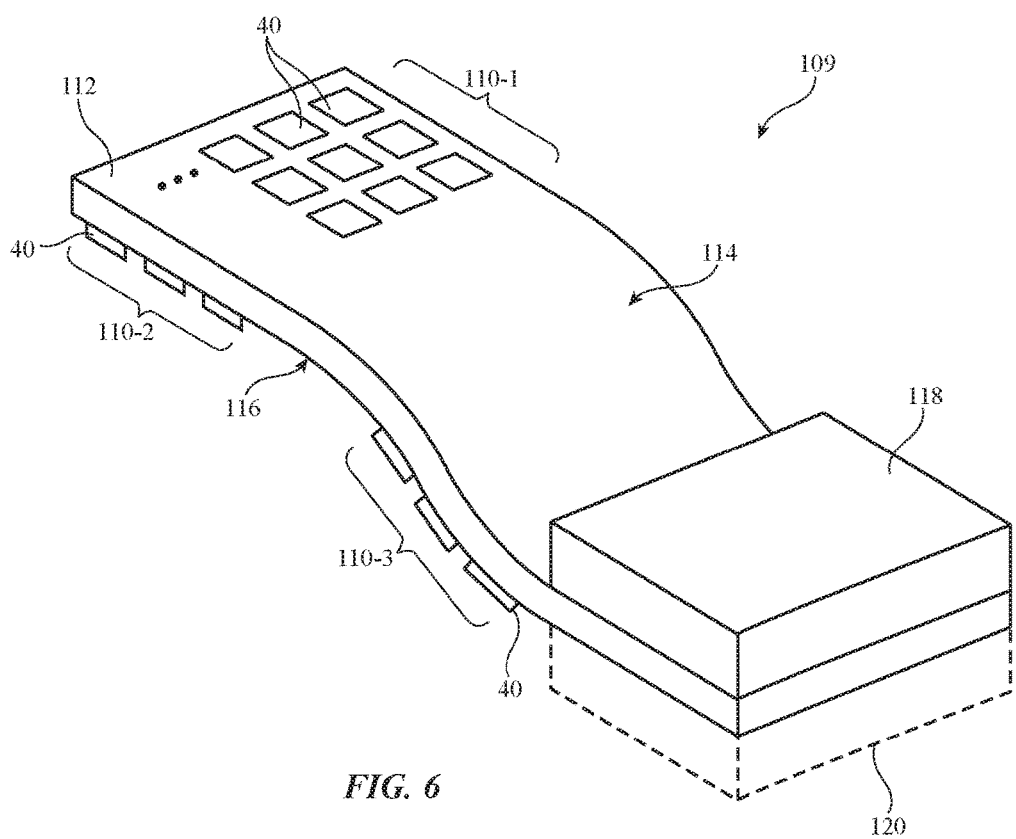
FIG. 6 is a perspective view of an illustrative integrated antenna module having one or more antenna arrays in accordance with an embodiment.

FIG. 6 is a perspective view of an illustrative integrated antenna module for handling signals at frequencies greater than 10 GHz (e.g., millimeter wave signals) or other signals. As shown in FIG. 6, device 10 may be provided with an integrated antenna module such as module 109. Module 109 may include one or more antennas 40 (e.g., patch antennas of the type shown in FIG. 5 or other suitable antennas for conveying signals between 10 GHz and 300 GHz) formed on a dielectric substrate such as substrate 112.

Substrate 112 may be, for example, a rigid printed circuit board formed from rigid printed circuit board substrate material (e.g., fiberglass-filled epoxy), a flexible printed circuit board (e.g., a printed circuit formed from sheets of polyimide or other flexible polymer layers), or a substrate that includes both rigid and flexible portions (e.g., portions formed from rigid printed circuit board material and portions formed from flexible printed circuit board material). In one suitable arrangement, substrate 112 includes multiple dielectric layers, and the antenna ground plane 106 (FIG. 5) of each antenna 40 is located on a different layer than the resonating elements 104 of the antennas. If desired, substrate 112 may include other dielectric materials such as plastic, epoxy, ceramic, polymers, glass, etc.

Any desired number of antennas 40 may be formed on substrate 112 (e.g., one antenna 40, two antennas 40, etc.). If desired, antennas 40 may be arranged in one or more phased antenna arrays 110 on substrate 112. For example, antennas 40 may be arranged in a first array 110-1 on first side 114 of substrate 112, a second array 110-2 on second side 116 of substrate 112, and/or a third array 110-3 on second side 116 of substrate 112. Second array 110-2 may, for example, be formed on the opposing side of the same segment of substrate 112 as first array 110-1 whereas third array 110-3 is formed on a different segment of substrate 112. Each array 110 may have any desired number of antennas 40 (e.g., two antennas, more than two antennas, four antennas, nine antennas, twelve antennas, sixteen antennas, etc.). Each array 110 may have the same number of antennas 40 or two or more arrays 110 may have a different number of antennas 40. Module 109 may include one, two, or all three of arrays 110-1, 110-2, and 110-3 or may include other arrays if desired. Module 109 may include more than three arrays if desired. Arrays 110 may include antennas 40 arranged in any desired pattern.

The use of phased arrays 110 allows the signals conveyed by antennas 40 to be steered using beam steering techniques (e.g., where the phase and magnitude of each antenna in the array is adjusted to steer the collective signals of the entire array in a particular direction). Each array 110 may be steerable over a corresponding hemisphere of possible coverage, for example. Control circuitry 14 (FIG. 1) may control two arrays 110 to cover two hemispheres of coverage and thus, an entire sphere around device 10 if desired. For example, circuitry 14 may steer an array on side (surface) 114 of module 109 such as array 110-1 and may steer an array on side (surface) 116 of module 109 such as array 110-2 and/or 110-3 to cover an entire sphere around module 109. In another suitable arrangement, flexible substrate 112 may be bent (folded) and two arrays on a single side of substrate 112 may be steered to cover an entire sphere around module 109.

One or more electrical components 118 may be mounted on side 114 of substrate 112. If desired, one or more components 118 may be mounted on side 116 of substrate 112 (as shown by dashed lines 120) in addition to or instead of mounting components 118 on side 114 of substrate 112. Components 118 may include, for example, transceiver circuitry such as transceiver circuitry 28 of FIG. 1. Components 118 may include integrated circuits (e.g., a transceiver integrated circuit or chip that includes transceiver 28) or integrated circuit packages mounted to substrate 120. Components 118 may sometimes be referred to herein as transceiver 118, transceiver components 118, or transceiver chips 118. If desired, components 118 may include control circuitry (e.g., some or all of control circuitry 14 of FIG. 1) or any other desired electrical components. Components 118 may, if desired, be enclosed within a metal shielding layer that shields components 118 from electromagnetic interference.

Conductive layers or other metal traces on substrate 112 may be used in forming transmission lines 92 for the antennas 40 in arrays 110. The transmission lines may be used to convey signals at frequencies between 10 GHz and 300 GHz (e.g. millimeter wave signals) between transceiver 118 and antennas 40.

Figure 7:
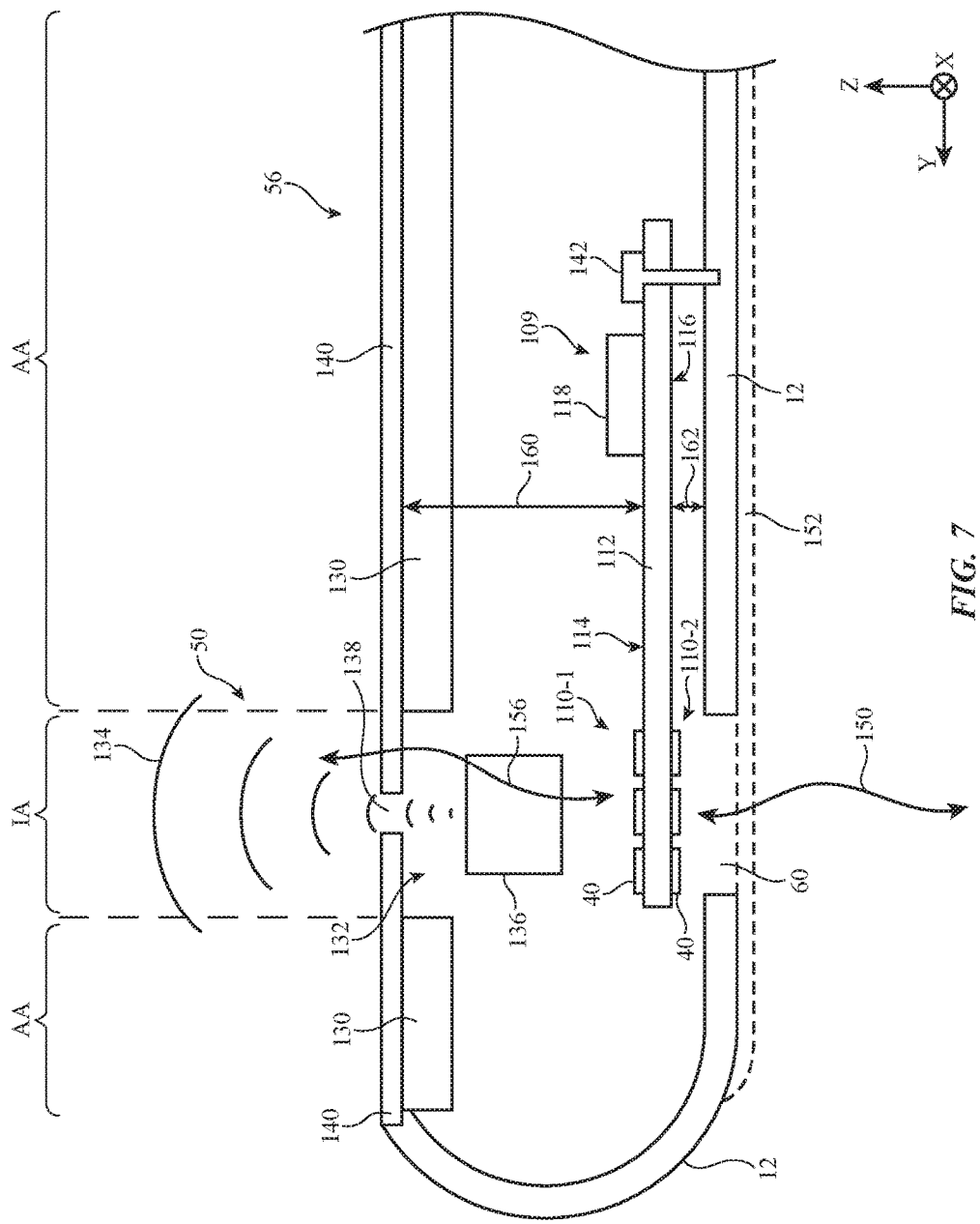
FIG. 7 is a cross-sectional side view of an illustrative electronic device having an integrated antenna module with an antenna array that is aligned with a speaker port and an inactive region of a display in accordance with an embodiment.

FIG. 7 is a cross-sectional side view of device 10 (e.g., taken in the Y-Z plane of FIG. 2) showing how antenna module 109 may be arranged within device 10 to align antennas 40 with inactive region IA of display 56 (e.g., to convey millimeter wave signals through the front face of device 10). As shown in FIG. 7, display 56 may be mounted to housing 12 (e.g., to peripheral housing structures 12E of FIG. 3). Display 56 may include an associated display module 130 and display cover layer 140. Display module 130 may be a liquid crystal display module, a light-emitting diode display module (e.g., an organic light-emitting diode display module), or other display for producing images for a user. Display module 130 may include touch sensitive components for gathering user input (e.g., in scenarios where display 56 is a touch screen). Display cover layer 140 may be a clear sheet of glass, a transparent layer of plastic, sapphire, or other transparent member.

In active area AA, an array of display pixels associated with display structures such as display module 130 may present images to a user of device 10. In inactive display region IA, display 56 may be free from display module 130 (e.g., from the pixels and touch sensor components of active area AA). Display module 130 may include multiple dielectric layers (e.g., a stack of dielectric layers) on which the pixels, touch sensor components, and other active circuitry are formed.

In one suitable arrangement, display 56 may include an opening 132 in display module 130 within inactive area IA. In another suitable arrangement, the dielectric layers of display module 130 may extend across opening 132 (e.g., so that the dielectric layers extend continuously across display 56) but without any display pixels or other active circuitry formed within region IA. In yet another suitable arrangement, dielectric material may be formed within opening 132.

As shown in FIG. 7, inactive area IA (e.g., opening 132) may align with speaker port 50 of device 10. Speaker port 50 may include an opening 138 in display cover layer 140. Opening 138 may be filed with a dielectric such as air or with solid material (e.g., to prevent moisture or other contaminants from being received within device 10). Speaker port 50 may include components 136 aligned with inactive area IA of display 56 and opening 138 in display cover layer 140.

Components 136 may include sound generation circuitry such as speaker components, audio cavity structures (e.g., an acoustic chamber or enclosure), diaphragm structures, speaker driver structures, a speaker coil (e.g., a conductive coil having a 4-6 mm diameter that is driven by audio signals to produce sound), or any other desired circuitry and structures for generating sound (e.g., for converting electronic audio data to mechanical sound). The speaker components may emit sound through opening 132 in display module 130 and through opening 138 in display cover layer 140, as shown by lines 134. If desired, components 136 may include other components such as one or more sensors (e.g., a proximity sensor, ambient light sensor, etc.), device status indicators, etc. The sensors may gather information through inactive region IA of display 56 (e.g., components 136 may include a light sensor that receives light through inactive area IA, a capacitive proximity sensor that detects changes in capacitance through inactive region IA, etc.).

Figure 8:
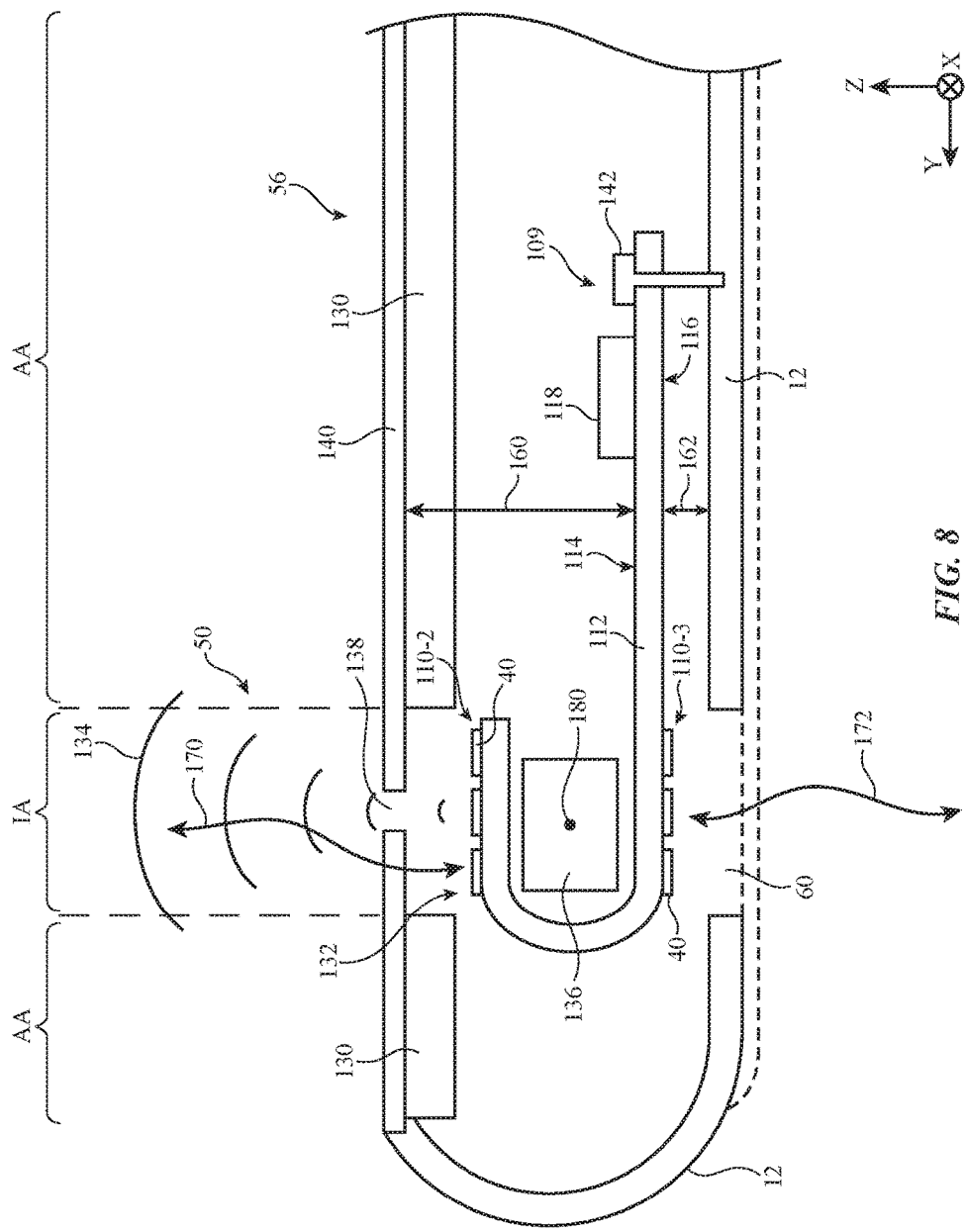
FIG. 8 is a cross-sectional side view of an illustrative electronic device having an integrated antenna module that is wrapped around speaker components in accordance with an embodiment.

Active area AA and display module 130 may completely surround inactive area IA, opening 132, opening 138, and speaker port 136 (e.g., laterally in the X-Y plane of FIG. 8). In this way, a first portion of display module 130 and active area AA may be interposed between speaker port 50 (e.g., display cover opening 138, opening 132, and components 136) and a first sidewall of housing 12 (e.g., a sidewall 12E as shown in FIG. 3) whereas a second portion of display module 130 and active area AA are interposed between speaker port 50 and a second sidewall of housing 12. Similarly, a third portion of display module 130 and active area AA may be interposed between speaker port 50 and a third sidewall of housing 12 and a fourth portion of module 130 and area AA may be interposed between port 50 and a fourth sidewall of housing 12.

Antenna module 109 may be mounted within housing 12 so that one or more antennas 40 are aligned with speaker port 50 and inactive region IA of display 56. In the example of FIG. 7, phased array 110-1 of antennas 40 on side 114 of substrate 112 is aligned with speaker port 50 and inactive region IA. Phased array 110-1 may transmit and receive wireless signals (e.g., at frequencies between 10 GHz and 300 GHz) through components 136, opening 132, and opening 138 (e.g., through speaker port 50 and inactive area IA of display 56) as shown by arrow 156. Wireless signals conveyed by array 110-1 may pass through one or more openings in components 136 or through dielectric portions of components 136 (e.g., a speaker diaphragm or the center of a speaker coil). In another suitable arrangement, array 110-1 and/or substrate 112 may be laterally offset along the X-axis of FIGS. 2 and 7 with respect to components 136 so that any conductive material in components 136 do not block path 156. If desired, array 110-1 and/or substrate 112 may be coplanar with the speaker or other portions of components 136 in the X-Y plane (e.g., in scenarios where components 136 include openings for accommodating substrate 112 or in scenarios where substrate 112 is laterally offset along the X-axis with respect to components 136).

Module 109 may be secured to housing 12 (e.g., to rear housing wall 12R as shown in FIG. 4) using conductive fastener 142. Conductive fastener 142 may include a conductive screw, conductive pin, conductive spring structures, conductive adhesive, or other fastening structures. Conductive fastener 142 may secure module 109 in place (e.g., to ensure that array 110-1 remains aligned with inactive region IA). If desired, conductive fastener 142 may serve as a heat spreader for transceiver 118 (e.g., conductive fastener 142 may transfer heat generated by circuitry 118 or other components to housing 12) and/or may serve to ground antennas 40 on substrate 112 to metal housing 12.

Module 109 may be mounted within housing 12 at a first distance 160 with respect to display cover layer 140 (e.g., the front face of device 10) and at a second distance 162 with respect to the rear of housing 12. Distance 160 may be greater than distance 162. For example, distance 160 may be between 3 mm and 6 mm (e.g., 4 mm) whereas distance 162 is between 0 mm and 2 mm (e.g., 1 mm). Substrate 112 may be in contact with the rear wall of housing 12, may be attached to the rear wall of housing 12 using adhesive, or may be separated from the rear wall of housing 12 by a non-zero distance. If desired, other components such as components 120 of FIG. 6, housing structures, printed circuit boards, brackets, or other structures may be formed between substrate 112 and the rear wall of housing 12 (e.g., to hold module 109 in place above the rear wall of housing 12).

In the example of FIG. 7, in order to provide coverage through the rear side of device 10, antenna module 109 may include a second array such as array 110-2 on side 116 of substrate 112. Array 110-2 may be aligned with opening 60 in the rear wall of conductive housing 112. Array 110-2 may transmit and receive wireless signals (e.g., signals at frequencies between 10 GHz and 300 GHz) through opening (aperture) 60, as shown by arrow 150. Ground traces for antennas 40 in arrays 110-1 and 110-2 may serve to shield array 110-1 from array 110-2 (e.g., to prevent interference between the signals handled by arrays 110-1 and 110-2). If desired, plastic or other dielectric materials may be formed in opening 60. If desired, dielectric layer 152 may be formed across the rear wall of conductive housing 12 (e.g., layer 152 may form an exterior rear surface of device 10). Dielectric layer 152 may include plastic, glass, ceramic, or any other desired dielectric material. In scenarios where dielectric layer 152 is formed, opening 60 may be filled with air if desired.

In this way, antenna module 109 may convey wireless signals at frequencies between 10 GHz and 300 GHz through both the front and rear faces of device 10. Control circuitry 14 may use beam steering techniques may to provide a complete sphere of coverage around all sides of device 10 using arrays 110-1 and 110-2. The example of FIG. 7 is merely illustrative. If desired, additional openings 60 may be aligned with additional arrays on side 116 of substrate 112 such as array 110-3. If desired, array 110-2 may be omitted and array 110-3 of FIG. 6 may be formed on module 109. In this scenario, opening 60 may be aligned with the location of array 110-3 (e.g., opening 60 need not be aligned with array 110-1 and inactive area IA). If desired, an opaque masking layer such as an ink layer may be formed on the inner surface of cover glass 140 within region IA and/or within aperture 60 to hide components 136 from view.

In another suitable arrangement, antenna module 109 may be wrapped around components 136 at inactive area IA. FIG. 8 is a cross-sectional side view of device 10 showing how module 109 may be wrapped around components 136. As shown in FIG. 8, module 109 may include multiple arrays formed on the same side 116 of substrate 112 such as arrays 110-2 and 110-3.

In this example, substrate 112 includes flexible material such as a flexible printed circuit board substrate. The flexible printed circuit board substrate may be used to form the entirety of substrate 112 or may be used to form the part of substrate 112 on which array 110-2 and, if desired, array 110-3 are formed (e.g., module 109 may include a rigid substrate on which transceiver 118 is formed and a flexible tail on which array 110-2 and optionally array 110-3 are formed).

Substrate 112 may be folded, bent, or wrapped around axis 180 (e.g., an axis parallel to the X-axis of FIG. 8) so that the end of substrate 112 on which array 110-2 is formed wraps around components 136 (e.g., so that arrays 110-2 and 110-3 lie within two parallel planes despite being formed on the same surface 116 of substrate 112). When configured in this way, array 110-2 may transmit and receive wireless signals (e.g., millimeter wave signals) through opening 132 and opening 138 (e.g., through speaker port 50 and inactive region IA of display 56) as shown by arrow 170. At the same time, array 110-3 may transmit and receive wireless signals through opening 60 in the rear wall of metal housing 12. Array 110-2 may lie within opening 132 in module 130 or may lie below the lower surface of module 130 (e.g., in scenarios where opening 132 is filled with the dielectric stack of module 130).

Speaker structures within components 136 may convey sound through openings in substrate 112 or, in another suitable arrangement, speaker structures within components 136 may be laterally offset along the X-axis with respect to array 110-2 or substrate 112 (e.g., so that array 110-2 and/or substrate 112 do not block sound 134 from being emitted through opening 138 of speaker port 50). In the arrangement of FIG. 8, antenna array 110-2 may be subject to less blocking or interference from components 136 (e.g., array 110-2 may exhibit better wireless performance) relative to array 110-1 in the arrangement of FIG. 7. If desired, array 110-2 may be coplanar with the speaker or other portions of components 136 in the X-Y plane (e.g., in scenarios where components 136 include openings for accommodating array 110-2 or in scenarios where array 110-2 is laterally offset along the X-axis with respect to components 136).

When configured in this way, control circuitry 14 may perform beam steering using arrays 110-2 and 110-3 to provide a full sphere of coverage from both sides of device 10 for transceiver circuitry 118. The example of FIG. 8 is merely illustrative. Array 110-3 and opening 60 need not be aligned with array 110-2 and inactive area IA. Additional arrays and additional openings 60 may be formed on side 116 of substrate 112. If desired, array 110-3 may be omitted and array 110-1 may be formed on side 114 of substrate 112 for conveying wireless signals through opening 60 and components 136 (e.g., ground traces in substrate 112 may shield arrays 110-2 and 110-1 in this scenario). If desired, substrate 112 may include more than one bend.

Figure 9:
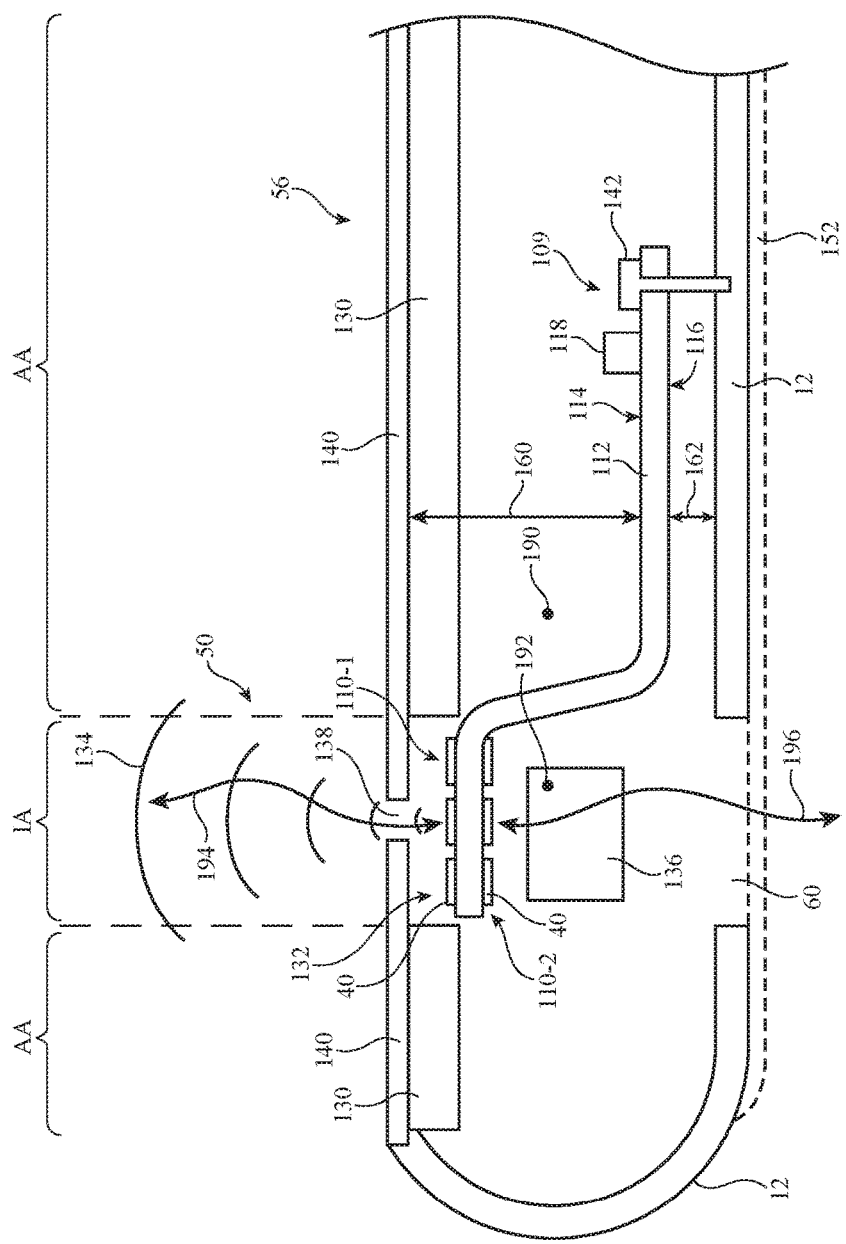
FIG. 9 is a cross-sectional side view of an illustrative electronic device having an integrated antenna module that is folded over speaker components in accordance with an embodiment.

FIG. 9 is a cross-sectional side view of device 10 showing how module 109 may include multiple bends. As shown in FIG. 9, module 109 may include multiple arrays formed on both sides of substrate 112 such as array 110-1 on side 114 of substrate 112 and array 110-2 on side 116 of substrate 112.

In this example, substrate 112 includes flexible material such as a flexible printed circuit board substrate. The flexible printed circuit board substrate may be used to form the entirety of substrate 112, may be used to form the portion of substrate 112 on which arrays 110-2 and 110-1 are formed, or may be used to form the portion of substrate 112 extending between the portion of substrate 112 on which arrays 110-2 and 110-1 are formed and the portion of substrate 112 on which transceiver 118 is formed (e.g., module 109 may include a rigid substrate on which transceiver 118 is formed and a flexible tail on which arrays 110-2 and 110-1 are formed or module 109 may include a first rigid substrate on which arrays 110-2 and 110-1 are formed, a second rigid substrate on which transceiver 118 is formed, and a flexible substrate extending between the first and second rigid substrates).

Substrate 112 may be folded, bent, or wrapped in a first direction around first axis 190 (e.g., an axis parallel to the X-axis of FIG. 9) and in a second direction around second axis 192 (e.g., an axis parallel to axis 190) so that the end of substrate 112 on which arrays 110-1 and 110-2 are formed is interposed between components 136 and inactive region IA of display 56. When configured in this way, array 110-1 may transmit and receive wireless signals (e.g., millimeter wave signals) through opening 132 and opening 138 (e.g., through speaker port 50 and inactive region IA of display 56) as shown by arrow 194. At the same time, array 110-2 may transmit and receive wireless signals through opening 60 in the rear wall of metal housing 12. Ground planes 106 for arrays 110-1 and 110-2 may serve to electromagnetically isolate the two arrays from each other. Array 110-1 may lie within opening 132 in module 130 or may lie below the lower surface of module 130 (e.g., in scenarios where opening 132 is filled with the dielectric stack of module 130).

Speaker structures within components 136 may convey sound through openings in substrate 112 or, in another suitable arrangement, speaker structures within components 136 may be laterally offset along the X-axis with respect to arrays 110-2 and 110-1 or substrate 112 (e.g., so that array 110-2, array 110-1, and/or substrate 112 do not block sound 134 from being emitted through opening 138 of speaker port 50). In the arrangement of FIG. 9, antenna array 110-1 may be subject to less blocking or interference from components 136 relative to the arrangement of FIG. 7. If desired, array 110-2, array 110-1, and/or substrate 112 may be coplanar with (e.g., in the X-Y plane) the speaker or other portions of components 136 (e.g., in scenarios where components 136 include openings for accommodating substrate 112 or in scenarios where substrate 112 is laterally offset along the X-axis with respect to components 136).

When configured in this way, control circuitry 14 may perform beam steering operations using arrays 110-2 and 110-1 to provide a full sphere of coverage from both sides of device 10 for transceiver circuitry 118. The example of FIG. 9 is merely illustrative. Array 110-2 and opening 60 need not be aligned with array 110-1 and inactive area IA. Additional arrays and additional openings 60 may be formed on side 116 of substrate 112. If desired, array 110-2 may be omitted and array 110-3 may be formed on side 116 of substrate 112 for conveying wireless signals through opening 60.

When configured in this way (e.g., using an arrangement with two arrays on opposing sides of a flat substrate 112 as shown in FIG. 7, using an arrangement with two arrays on the same side of a bent substrate 112 as shown in FIG. 8, or using an arrangement with two arrays on opposing sides of a bent substrate as shown in FIG. 9), antennas 40 may provide coverage over an entire sphere around all sides of device 10, despite the fact that device housing 12 is formed from metal and a display forming the front face of device 10 has active circuitry extending across both the length and width of device 10 (as shown in FIG. 3).

The examples of FIGS. 7-9 are merely illustrative. If desired, opening 60 may be omitted and arrays may be formed from conveying signals through inactive region IA of display 56 only (e.g., over a hemisphere about the front face of device 10). Substrate 112 may have any desired shape. Any desired number of antennas and antenna arrays maybe used on antenna module 118. In another suitable arrangement, transceiver 110 is formed on a separate substrate from the arrays on substrate 112. If desired, different arrays 110 may be formed on different substrates.

The foregoing is merely illustrative and various modifications can be made to the described embodiments. The foregoing embodiments may be implemented individually or in any combination.

What is claimed is:

1. An electronic device, comprising:
   a conductive housing having first, second, third, and fourth peripheral walls, wherein the first peripheral wall opposes the second peripheral wall, the third peripheral wall opposes the fourth peripheral wall, and the third and fourth peripheral walls extend from the first peripheral wall to the second peripheral wall;
   a display mounted to the conductive housing, wherein the display comprises an active region and an inactive region, the active region has pixel circuitry that displays images, and the inactive region has:
      a first edge defined by a first portion of the active region,
      a second edge that is defined by a second portion of the active region and that opposes the first edge, and
      a third edge that is defined by a third portion of the active region and that extends from the first edge to the second edge;
   a speaker aligned with the inactive region of the display and configured to emit sound through the inactive region of the display, wherein the speaker is interposed between the first peripheral wall and the third edge of the inactive region, the first portion of the active region is interposed between the first edge of the inactive region and the third peripheral wall, the second portion of the active region is interposed between the second edge of the inactive region and the fourth peripheral wall, and the third portion of the active region is interposed between the third edge of the inactive region and the second peripheral wall; and
   an antenna aligned with the inactive region of the display and configured to convey wireless signals at a frequency greater than 10 GHz through the inactive region of the display.

2. The electronic device defined in claim 1, further comprising:
   a dielectric substrate, wherein the antenna is mounted to the dielectric substrate; and
   transceiver circuitry mounted to the dielectric substrate.

3. The electronic device defined in claim 2, further comprising:
   an additional antenna on the substrate, wherein the conductive housing comprises a dielectric-filled opening aligned with the additional antenna and the additional antenna is configured to convey additional wireless signals at a frequency greater than 10 GHz through the dielectric-filled opening.

4. The electronic device defined in claim 3, wherein the substrate has opposing first and second sides, the antenna is formed at the first side of the substrate, the additional antenna is formed at the second side of the substrate, and the speaker is interposed between the substrate and the inactive region of the display.

5. The electronic device defined in claim 3, wherein the substrate has opposing first and second sides and the antenna and the additional antenna are both formed at the first side of the substrate.

6. The electronic device defined in claim 5, wherein the substrate is folded around the speaker and the speaker is interposed between the first and second antennas.

7. The electronic device defined in claim 3, wherein the substrate has opposing first and second sides, the antenna is formed at the first side of the substrate, the additional antenna is formed at the second side of the substrate, and the substrate comprises a first bend in a first direction around a first axis and a second bend in a second direction around a second axis parallel to the first axis.

8. The electronic device defined in claim 3, further comprising:
a first phased antenna array that includes the antenna, wherein the first phased antenna array is configured to convey the wireless signals through the inactive region of the display;
a second phased antenna array that includes the additional antenna, wherein the second phased antenna array is configured to convey the additional wireless signals through the dielectric-filled opening in the conductive housing; and
control circuitry that is configured to control the first and second phased antenna arrays to perform beam steering operations.

9. The electronic device defined in claim 1, further comprising a sensor selected from the group consisting of: an ambient light sensor, an infrared light sensor, and a proximity sensor, wherein the sensor is aligned with the inactive region of the display.

10. The electronic device defined in claim 1, wherein the display comprises a display module having a plurality of dielectric layers and a transparent cover layer formed over the display module, the pixel circuitry is formed on the plurality of dielectric layers within the active region of the display, a first opening is formed in the plurality of dielectric layers within the inactive region of the display, a second opening is formed in the transparent cover layer within the inactive region of the display, and the first and second openings are aligned with the speaker and the antenna.

11. An electronic device, comprising:
a display having an active region and an inactive region, wherein the active region defines at least first and second opposing edges of the inactive region;
a housing having a conductive housing wall that opposes the display, wherein a dielectric-filled opening is formed in the conductive housing wall;
a dielectric substrate;
a first phased array of antennas on the dielectric substrate that is configured to convey first wireless signals through the inactive region of the display; and
a second phased array of antennas on the dielectric substrate that is configured to convey second wireless signals through the dielectric-filled opening in the conductive housing wall.

12. The electronic device defined in claim 11, further comprising:
transceiver circuitry for the first and second phased arrays of antennas mounted to the dielectric substrate.

13. The electronic device defined in claim 12, wherein the first phased array of antennas comprises a first phased array of millimeter wave antennas, the second phased array of antennas comprises a second phased array of millimeter wave antennas, the first wireless signals comprise first millimeter wave signals, and the second wireless signals comprise second millimeter wave signals.

14. The electronic device defined in claim 13, further comprising:
a speaker coil aligned with the inactive region of the display, wherein the first phased array of antennas is configured to convey the first wireless signals through the speaker coil.

15. The electronic device defined in claim 14, wherein the display comprises a display module and a transparent cover layer over the display module, further comprising:
a sensor aligned with the inactive region of the display and configured to receive light through the display cover layer.

16. An electronic device, comprising:
a display having an inactive area that does not display image data and an active area that displays image data and completely surrounds the inactive area at a face of the electronic device; and
an antenna aligned with the inactive area of the display, wherein the antenna is configured to transmit and receive wireless signals through the inactive area of the display.

17. The electronic device defined in claim 16, wherein the electronic device has opposing first and second ends, further comprising:
a conductive housing having a first peripheral sidewall at the first end and a second peripheral sidewall at the second end, wherein the active area of the display comprises a first region interposed between the first peripheral sidewall and the inactive area and a second region interposed between the second peripheral sidewall and the inactive area.

18. The electronic device defined in claim 17, further comprising:
a phased antenna array that includes the antenna, wherein the phased antenna array is configured to transmit and receive the wireless signals through the inactive area of the display.

19. An electronic device having opposing first and second ends, the electronic device comprising:
a display having an inactive area that does not display image data and having an active area that displays image data, the active area defining an edge of the inactive area at a face of the electronic device;
a phased antenna array having an antenna aligned with the inactive area of the display;
a conductive housing having a first peripheral sidewall at the first end and a second peripheral sidewall at the second end, the edge of the inactive area being interposed between the inactive area and the first peripheral sidewall, the inactive area being interposed between the edge of the inactive area and the second peripheral sidewall, and the phased antenna array being configured to transmit and receive radio-frequency signals at a frequency greater than 10 GHz through the inactive area of the display;
a first additional antenna having a first antenna resonating element arm formed from the first peripheral sidewall;
a second additional antenna having a second antenna resonating element arm formed from the second peripheral sidewall; and
transceiver circuitry configured to transmit and receive cellular telephone signals using the first and second additional antennas.

20. The electronic device defined in claim 19, wherein the display has a display cover layer with an opening, the opening is aligned with the inactive area, the active area defines at least two additional edges of the inactive area, and the electronic device further comprises a speaker aligned with the inactive area and an image sensor aligned with the inactive area.

* * * * *